United States Patent [19]

Richards

[11] 4,184,786
[45] Jan. 22, 1980

[54] EARTH DAM PROTECTIVE COVERING

[76] Inventor: Charles D. Richards, P.O. Box No. 999, Middlesboro, Ky. 40965

[21] Appl. No.: 883,477

[22] Filed: Mar. 6, 1978

[51] Int. Cl.² .................... E02B 3/04; E02B 7/02; E02B 7/06
[52] U.S. Cl. .................... 405/108; 405/117; 405/270; 428/255
[58] Field of Search ............ 61/30, 22, 36, 49, 3; 428/255, 256; 52/2; 405/107, 84, 109, 270, 116, 117, 108, 107

[56] References Cited

U.S. PATENT DOCUMENTS

| 974,315 | 11/1910 | Vancil | 61/30 |
|---|---|---|---|
| 2,682,484 | 6/1954 | Thomas | 428/255 |
| 2,872,733 | 2/1959 | Mackey | 52/2 |
| 2,949,743 | 8/1960 | Scheidenhelm | 405/107 |
| 2,999,041 | 9/1961 | Lappala | 428/255 |
| 3,343,370 | 9/1967 | Twele et al. | 405/107 |
| 3,415,062 | 12/1968 | Ziegenmeyer | 61/12 |
| 3,474,625 | 10/1969 | Draper et al. | 405/270 |
| 3,680,319 | 8/1972 | Draper et al. | 405/116 |
| 3,885,800 | 12/1974 | Ganzinotti | 61/29 |
| 3,938,339 | 2/1976 | Gaudard | 61/30 |
| 3,993,827 | 11/1976 | Dukert | 428/256 |

FOREIGN PATENT DOCUMENTS 577483  5/1958  Italy .................. 405/270

Primary Examiner—Alexander Grosz
Attorney, Agent, or Firm—Stoll and Stoll

[57] ABSTRACT

Method and means for protecting earth dams from failure caused by overflow or internal (tunnel) erosion. The invention provides a barrier between the dam and the impounded water in the form of a water-impervious covering for the vulnerable surfaces of the dam. At the least the covering should sheathe the top and upstream face, but better protection is provided by extending the covering to the downstream surface. The covering is flexible to conform to the contours and surface irregularities of the dam, and anchoring means are provided to secure the covering to the dam and to prevent or minimize seepage.

10 Claims, 19 Drawing Figures

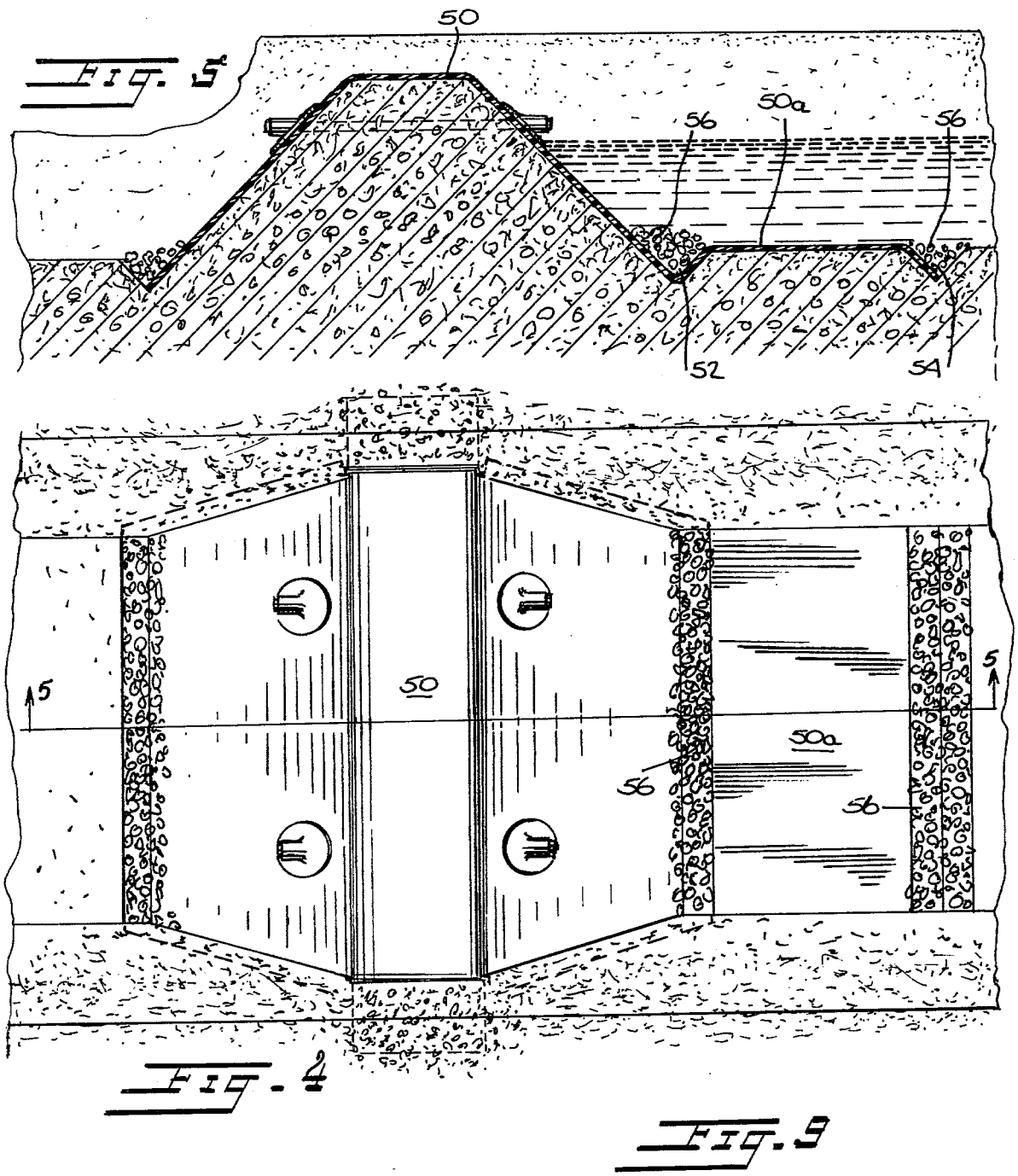

EARTH DAM PROTECTIVE COVERING

BACKGROUND OF THE INVENTION

1. Field of the Invention

The invention relates to earth dams, especially, but not exclusively, dams constructed without concrete core walls, and to structurally similar dams such as gob pile dams and those formed of silt. The invention is also applicable to structurally analogous water retaining embankments such as major river levees and sea dikes.

2. Prior Art

The closest patent art known to applicant consists of the following United States patents:

| U.S. Pat. No. | Name |
|---|---|
| 2,138,366 | Baird |
| 3,067,585 | Hait |
| 3,113,435 | Yount |
| 3,234,741 | Ionides |
| 3,383,863 | Berry |
| 3,415,022 | Schaefer |
| 3,568,453 | Ziegenmeyer |
| 3,854,292 | Nienstadt |

Applicant is also aware of the following unpatented prior art in the form of printed publications:

"Water & Sewage Works", March, 1976 - Article entitled "Floating Covers Protect Reservoirs", and Brochures entitled "Pond Liners and Covers of Du Pont Hypalon" and "For Pollution Control-The Unique Du Pont 3110-Pond/Pit Liner System", both brochures published by E. I. du Pont de Nemours & Co. of Wilmington, Delaware.

These references, patented, and unpatented, pertain mainly to relatively quiescent bodies of water such as water reservoirs, settling ponds and impounding basins. Even when related to moving water, as in irrigation or drainage canals and ditches, the objective is containment in the sense of minimizing leakage or seepage, rather than resistance to hydraulic erosion and breach of the impounding structure. The references teach the use of inner linings as distinguished from the outer coverings of the present invention.

SUMMARY OF INVENTION

This invention has as its principal objective the prevention of rupture of earth dams caused by erosion when the impounded water overflows the dam or tunnels through it. The invention is concerned especially—but not exclusively—with existing dams which are particularly vulnerable to flood conditions. Ruptured earth dams in the Appalachian coal regions have caused great loss of life and property in recent years, and it is believed that the present invention can help prevent such tragedies.

Another objective of this invention is to secure the structural integrity of earth dams to enable them to support small hydro-electric power generators as proposed by David E. Lilienthal in the September 1977 issue of the Smithsonian magazine.

Essentially, the present invention achieves these goals by preventing destructive erosion of the dam structure by the impounded water. Generally speaking, such destructive erosion is caused (a) when the impounded water rises above the crest of the dam and overflows same, or (b) when leakage occurs through seepage barriers, as in the case of a ruptured core. It is believed (The Military Engineer, January-February, 1978) that the disintegration of the Teton Dam illustrates the latter cause of failure, while the Buffalo Creek disaster illustrates the former. It is believed that in each of these instances, a protective covering as herein provided would have prevented the erosion which destroyed the dam.

Briefly stated, the invention provides a water-impervious covering for earth dams and means for anchoring the covering to the dam to prevent erosion by overflow water or internal leakage. The covering is a flexible plastic sheet or combination of sheets capable of functioning as a water-tight barrier between the dam and the impounded water. The covering is relatively easily laid and anchored. Its flexibility enables it to conform to the contours of the dam and it surface irregularities.

It is relatively inexpensive material, readily available, and quickly installed. If adequately protected against damage by boats, floating logs, ice floes and the like, the protective covering herein described should provide effective dam protection for years, Moreover, it is readily repaired or replaced.

BRIEF DESCRIPTION OF THE DRAWING

FIG. 4 is a plan view showing an earth dam which is protected by a covering which sheathes both the dam and an adjacent portion of the floor or bed underlying the impounded body of water.

FIG. 5 is a vertical section on the line 5—5 of FIG. 4.

FIG. 9 is a section on the line 9—9 of FIG. 7.

DESCRIPTION OF PREFERRED EMBODIMENTS OF THE INVENTION

Figure 1:
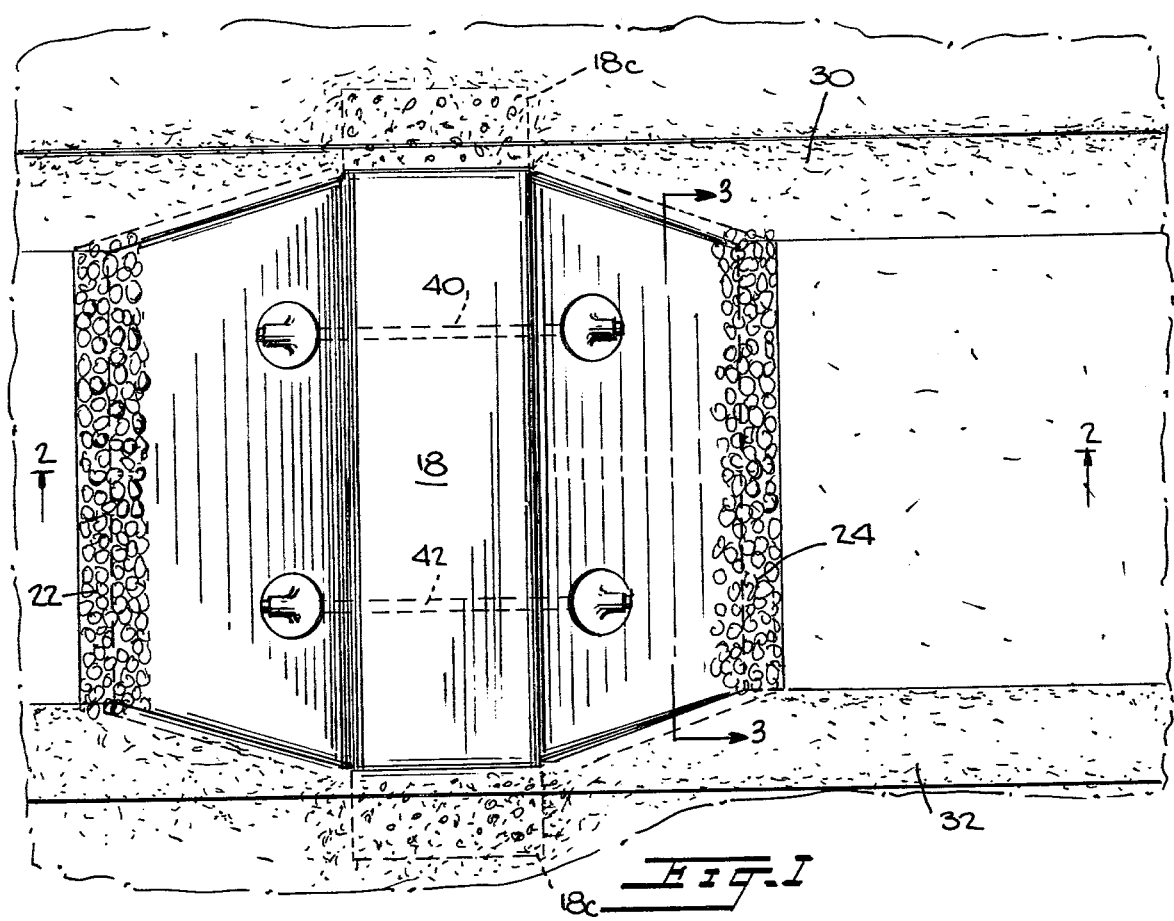
FIG. 1 is a plan view of an earth dam which is protected by the covering of the present invention.
Figure 2:
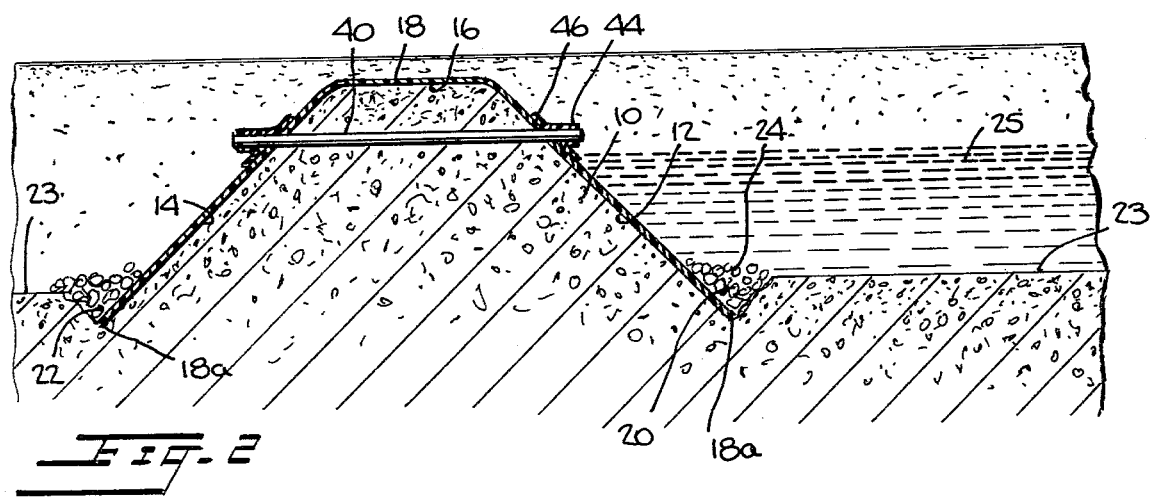
FIG. 2 is a vertical section therethrough on the line 2—2 of FIG. 1.
Figure 3:
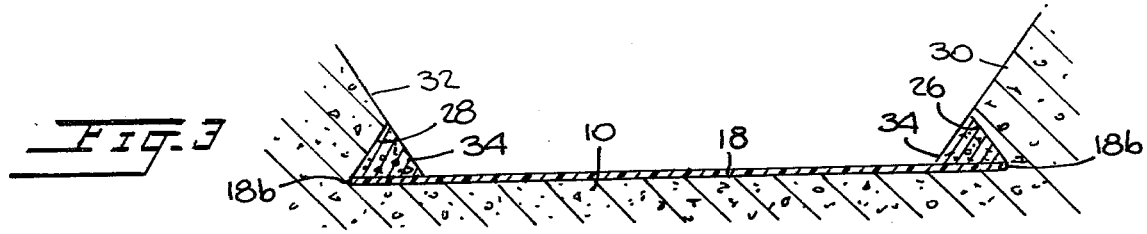
FIG. 3 is a transverse section on the line 3—3 of FIG. 1.
Figure 6:
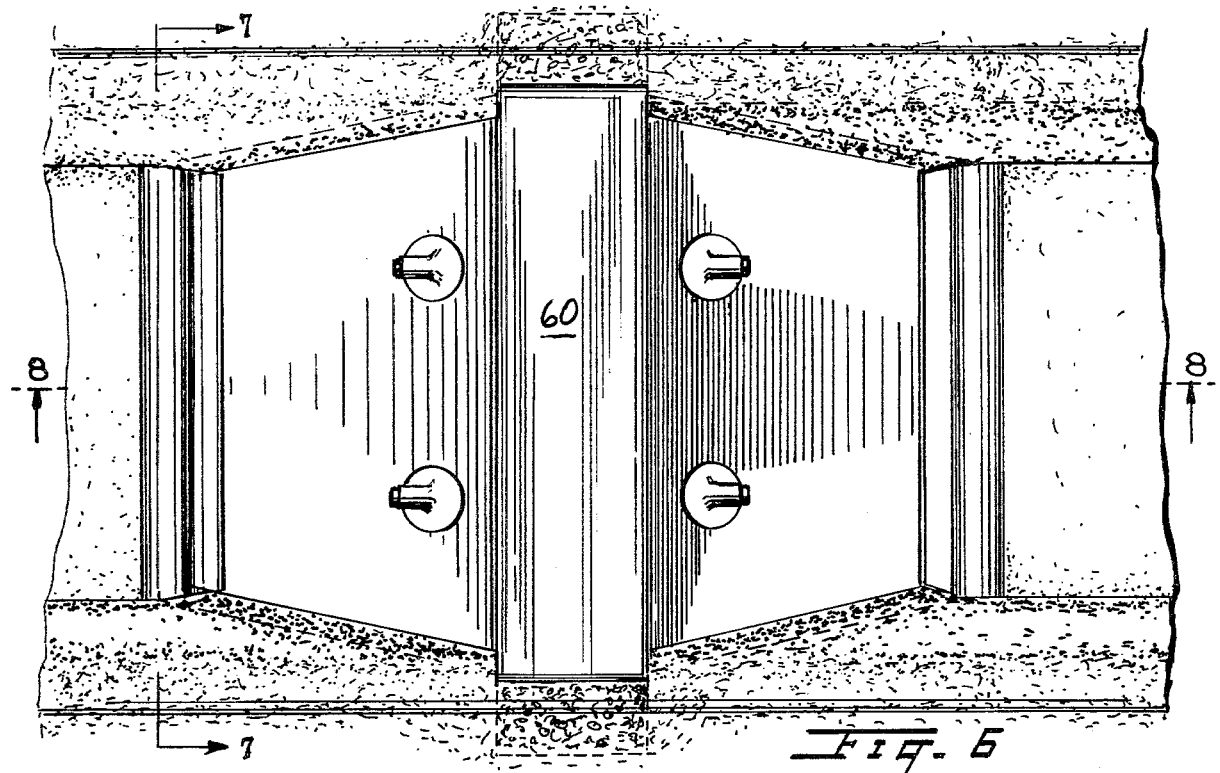
FIG. 6 is a plan view of another form of covered dam, showing a modification of the anchoring means.
Figure 7:
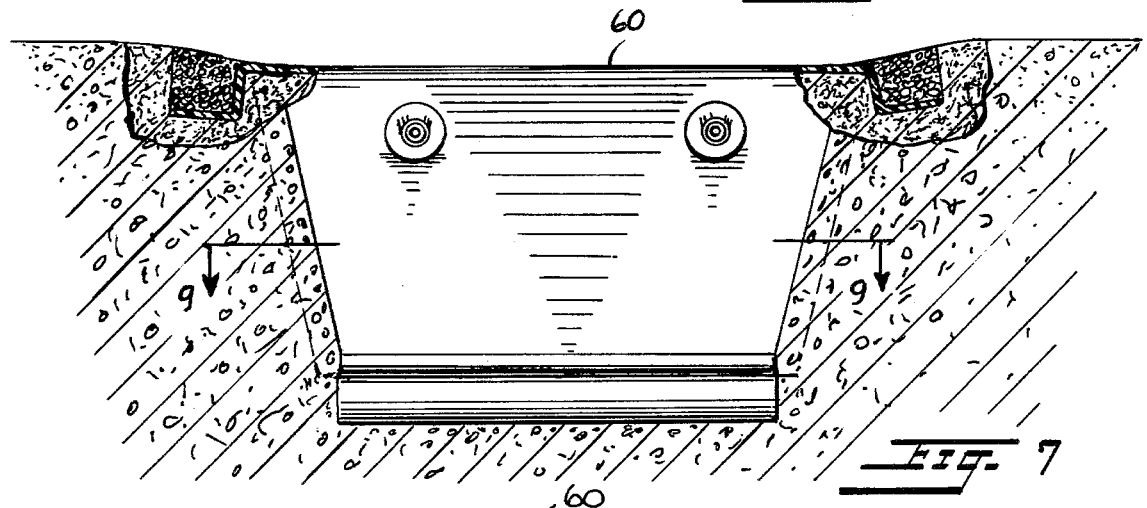
FIG. 7 is a vertical section on the line 7—7 of FIG. 6.
Figure 8:
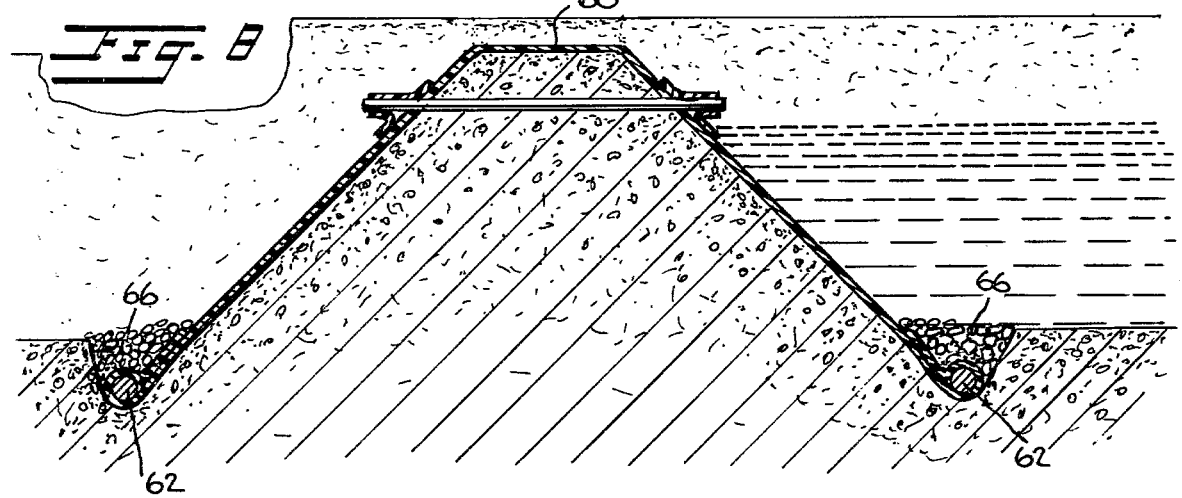
FIG. 8 is a transverse section on the line 8—8 of FIG. 6.

Referring now to the first form of the invention as shown in FIGS. 1–3 of the drawing, it will be seen that a typical earth dam 10 is covered on its upstream face 12, its downstream face 14 and its crest 16 with a protective covering 18. The lower ends 18a of the covering extend into trenches 20, 22 formed in river bed or lake bottom 23 or the like at the upstream and downstream faces of the dam. Anchoring these ends in said trenches is stone or rock ballast 24.

The side edges 18b of the covering extend into side channels 26, 28 formed in side embankments 30, 32 on opposite sides of the dam. Stone or rock ballast 34 anchor side edges 18b of the covering in said side channels. Additionally, covering 18 is provided with a pair of oppositely extending flaps 18c which project laterally from the intermediate section of the covering which sheathes the crest of the dam. These lateral flaps extend into slots formed in side embankments 30, 32 and they are anchored in said slots by the embankment material itself or stone or rock ballast.

It will thus be seen that all of the side and end edges of the covering are securely anchored in trenches, channels or slots, as appropriate, formed in the river bed or lake bottom and side embankments. The impounded water 25 is thereby prevented from entering between the covering and the dam. Since the covering is impervious to water, the impounded water is prevented from penetrating the dam and eroding a tunnel through it. When the impounded water overflows the dam, the protective covering will prevent the water from eroding a gap into the dam. It is these forms of erosion which breach earth dams and cause their destruction.

It will be understood from the foregoing, that the protective covering must be made of relatively strong, flexible sheet material, impervious to water, chemically inert with respect to the water and other substances to which it is exposed. It should be sufficiently flexible to conform to the contours and surface irregularities of the dam. It should have sufficient shear strength to resist rupture under anticipated stress conditions. It should be physically and chemically impervious to the impounded water and foreign matter at the particular dam site for which it is intended. For example, it should be resistant to acidic run-off water at coal mining and processing operations. And it should have other important properties such as resistance to oxidation, temperature extremes and other conditions to which it may be subjected.

The invention is not limited to any particular covering material, since any such material which has the desired properties and characteristics will satisfy the requirements of the invention. One such suitable material is the synthetic rubber which is sold by E. I. du Pont de Nemours & Co., of Wilmington, Delaware, under the trademark Hypalon. The specifications of Hypalon as set forth in the du Pont brochure first above identified are incorporated herein by reference. Hypalon is a chlorosulfonated polyethylene polymer which has the above described properties; it also has other desirable features such as the ability to adhere strongly to itself by heat or solution welding. This is a very important feature since it may be necessary to construct a relatively large covering from relatively small sheeting. One application of this feature is shown in FIGS. 1 and 2. Conduits 40 and 42 are intended to represent overflow ducts or spillways and it will be noted that in the illustrated form of the invention, the exposed ends of these conduits are encased in collars 44. These collars are integral with annular flanges 46, both being made of the same Hypalon material as the sheet covering. The collars may be welded to the covering to provide leakproof joints between them.

Another suitable material is described in the second above mentioned du Pont brochure, namely, the material which du Pont sells under the trademark 3110. This is an elasticized polyolefin which has similar properties to those above set forth. The specifications of 3110 as described in said second du Pont brochure are incorporated herein by reference.

The BFGoodrich Company of Akron, Ohio markets another suitable sheet material under the trademark BFGoodrich Flexseal, currently used primarily as a liner for reservoirs and holding and recovery ponds. Flexseal comprises a polyester scrim fabric reinforcement laminated between two 15 mil thick covers calendered from du Pont's Hypalon synthetic rubber.

Turning now to the second illustrated form of the invention, as shown in FIGS. 4 and 5, it will be seen that dam covering 50 has an extension piece 50a which covers the river bed or lake bottom situated adjacent the upstream face of the dam. Two spaced, parallel trenches 52 and 54 are formed in said river bed or lake bottom, the former adapted to receive a fold in the covering, the latter adapted to receive the upstream end of the covering. Stone or rock ballast 56 is deposited on the portions of the covering which project into said trenches to anchor the covering in place. The extension piece 50a of the covering and the two ballast anchors provide greater security against seepage of the impounded water between the dam and the covering.

The third form of the invention as illustrated in FIGS. 6–9 shows another kind of anchoring means. In the first two forms of the invention the raw side and end edges are secured by the ballast. In the third form of the invention, the corresponding side and end edges are rolled around cores adapted to strengthen them and to enhance their anchoring qualities. Thus, the upstream and downstream ends of covering 60 are rolled around and secured to cores 62, while the side edges of said covering are rolled around and secured to comparable cores 64. Each of these cored edges is disposed within a corresponding trench or channel and it is anchored therein by means of stone or rock ballast 66. It will be understood that the presence of the cores helps to lock the edges of the covering in the trenches or channels which they occupy.

Figure 10:
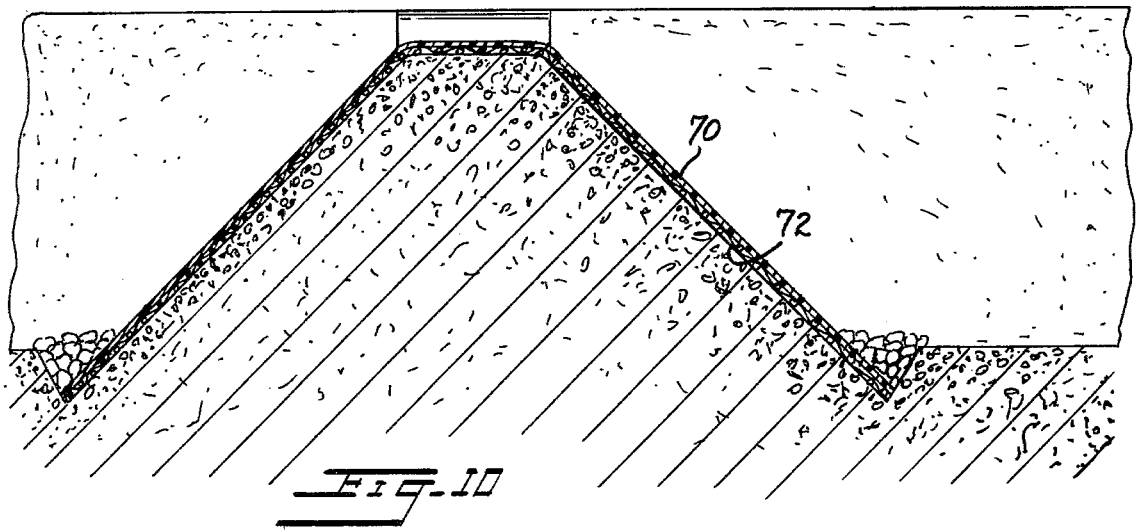
FIG. 10 is a vertical section through a covered dam showing a reinforced covering.
Figure 11:
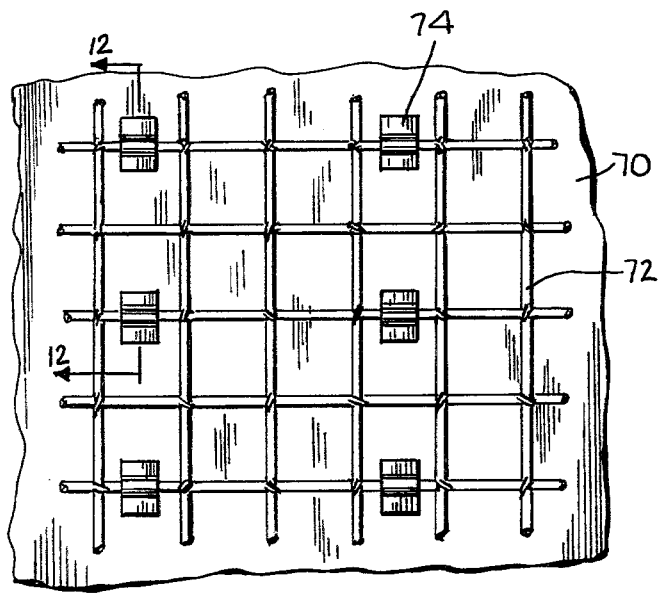
FIG. 11 is a fragmentary, enlarged, plan view of the reinforced covering.
Figure 12:
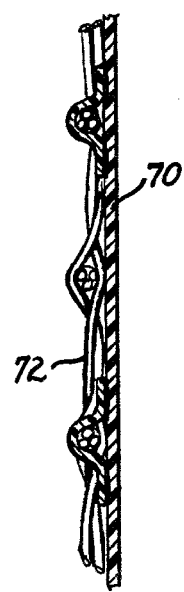
FIG. 12 is a section taken on the line 12—12 of FIG. 11.

FIGS. 10, 11, 12 show a modified covering construction in the form of a sheet 70 supported by and secured to a reinforcing net 72. Sheet 70 may be made of the same material as the covering sheets above described. Net 72 may be made of any suitable reinforcing material such as nylon rope or stainless steel cables. It may be secured to the sheet by means of plastic tabs or strips 74 welded or cemented thereto.

Reinforcing net 72 performs several functions. Its primary function is to reinforce, and thereby strengthen, the covering sheet. It also provides a support for the sheet to enable it to be lifted, moved and installed. Additionally, it provides suspension means for suspending the sheet from the top of the dam. Since the sheet is no longer self-supporting, tension on the sheet is relieved. The reinforcing net also helps prevent abrasion of the sheet against the walls of the dam.

Figure 13:
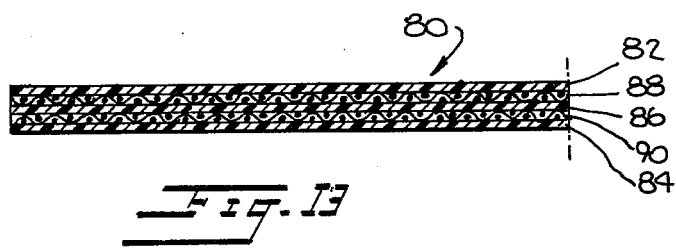
FIG. 13 is a fragmentary, enlarged section though a multi-ply reinforced covering.

FIG. 13 shows another form of covering 80 comprising a laminated structure of multiple layers of sheet material interleaved with reinforcing material. Specifically, and by way of illustration, covering 80 is a bonded composite structure consisting of outer sheets 82 and 84, intermediate sheet 86, and interleaved reinforcing sheets 88, 90. By way of example, layers 82, 84 and 86 may be made of the same sheet material which is above described, while reinforcing layers 88 and 90 may be made of woven nylon or wire mesh. The several layers may be cemented or bonded or welded together to form a composite structure of great strength. The invention is not limited to the precise number of laminations shown in the drawing. At least two laminations will suffice, one outer sheet and one reinforcing sheet or other combinations thereof.

Figure 14:
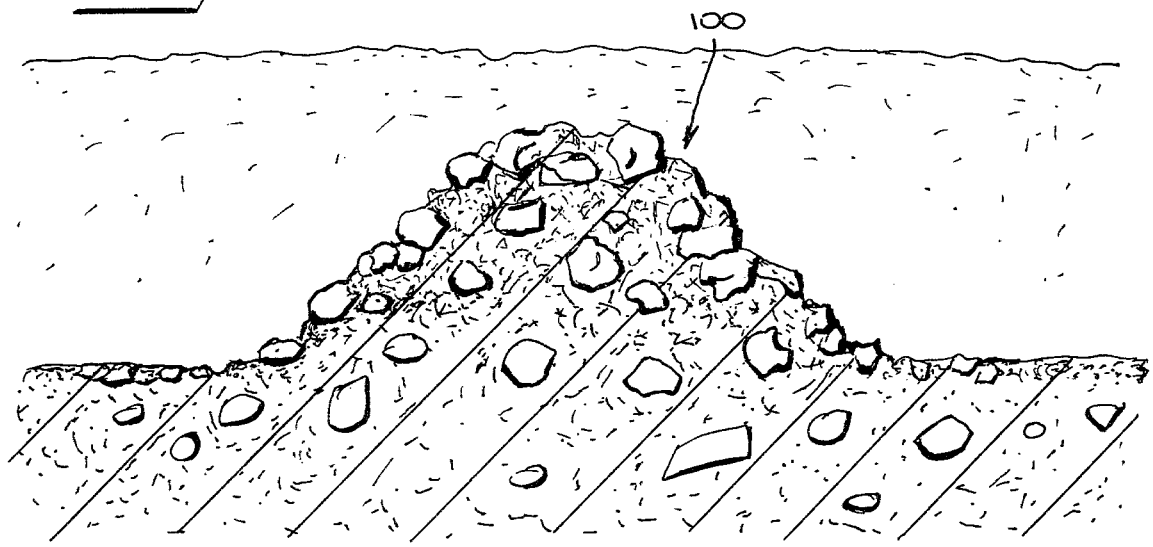
FIG. 14 is a sectional view through an earth dam showing its cross-sectional contours and irregular surfaces.

FIGS. 14-18 show a progression of steps in the installation of a dam covering in accordance with the present invention. Dam 100 in FIG. 14 is intended to represent a typical earth dam (except for the slope angles) showing its exposed irregular surfaces. If these surfaces are too rough or jagged to receive the protective covering of the present invention, it is necessary to apply a covering of small stones or crushed rock 102 to form relatively smooth, continuous surfaces. See FIG. 15.

Figure 18:
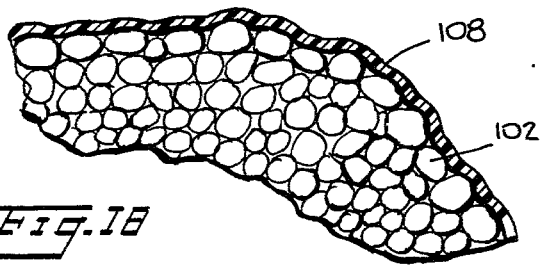
FIG. 18 is an enlarged, fragmentary section showing the protective covering conforming to the minor irregularities defined by the small stone surfaces.
Figure 16:
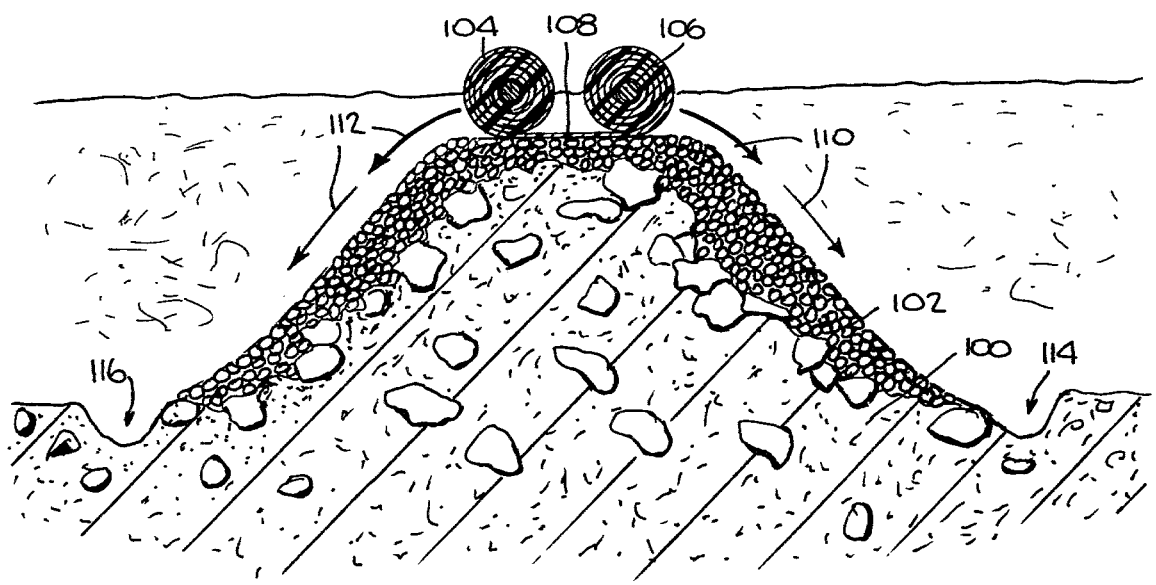
FIG. 16 is a view similar to that of FIG. 15 showing two connected rolls of protective covering placed on the crest of the dam preparatory to applying said covering to the relatively smooth, continuous surfaces.
Figure 17:
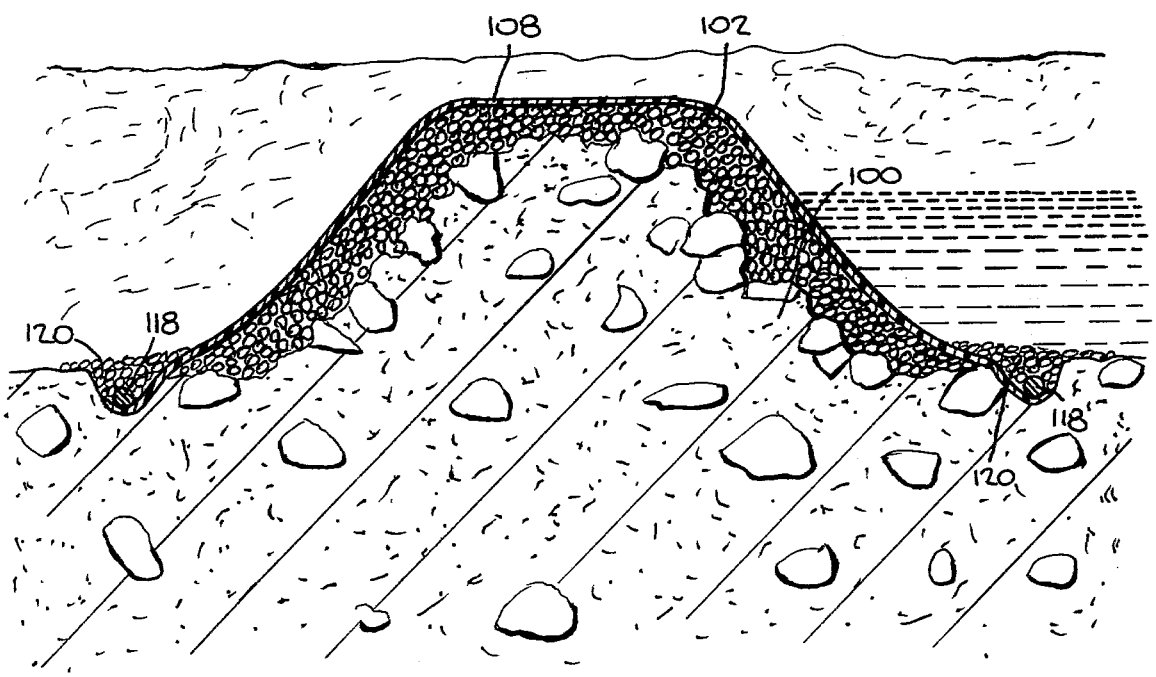
FIG. 17 is a view similar to that of FIG. 16 but showing the protective covering unrolled and anchored to sheathe and protect the dam.

Connected rolls 104, 106 of protective covering 108 may be placed on the crest of the dam, as shown in FIG. 16, and they may then be unrolled down the upstream and downstream faces of the dam as indicated by arrows 110, 112. The final result is depicted in FIGS. 17 and 18 where the protective covering is shown conforming to the relatively regular surfaces provided by the smooth stones or crushed rock 102. The ends of the covering extend into trenches 114, 116 where they are anchored in place by the cores 118 of rolls 104, 106 and stone or rock ballast 120.

Figure 19:
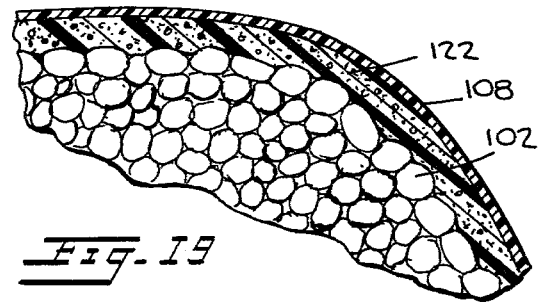
FIG. 19 is a view similar to that of FIG. 18 but showing a padding between the protective covering and the small stone surfaces.
Figure 15:
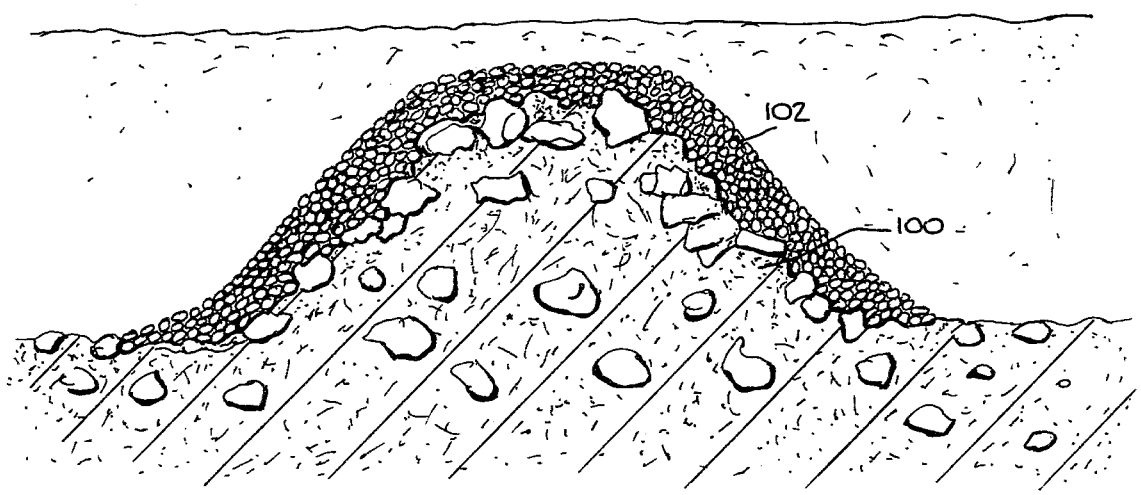
FIG. 15 is a similar view through said earth dam with a covering of small stones or crushed rock or the like to provide relatively smooth, continuous surfaces.

Another possibility, should the surface provided by stones 102 be too irregular to receive the protective covering, is to place a pad or cushion 122 between the stones 102 and the covering 108. See FIG. 19. The pad or cushion may be made of polyurethane foam or any other suitable padding material. It may be laminated to the covering or it may be separate therefrom, as desired. In either case, the pad or cushion provides a smooth, resilient backing for the covering.

The foregoing is intended solely for illustrative purposes. Clearly, modifications and variations of the illustrated forms of the invention are contemplated to adapt the invention to different covering materials, different dam structures and conditions, and different handling methods and equipment. The invention is not limited to the anchoring means depicted in the drawing. Any suitable anchoring means may be used such as the conventional stakes used to anchor tent structures.

For the purposes of the claims, "earth dams" shall include all forms of dam and levee structures hereinabove described in the section entitled "Field of the Invention". Also for the purposes of the claims, "continuous sheet" shall include a single, integral sheet, and a sheet comprised of multiple interconnected sections secured to each other by welding, cementing or other bonding means.

I claim:

1. A protective external covering for earth dams, said protective covering being adapted to protect the earth dams from failure caused by overflow or internal erosion by providing an external overflow passage over the dam, separated from the surface of the dam, said protective covering comprising:
   (a) a water impervious sheet which sheathes the crest and upstream and downstream faces of an earth dam, and
   (b) anchoring means for securing the sheet to the dam and preventing the entry of impounded water between the sheet and the dam,
   (c) the dimensions of the sheet exceeding the dimensions of the surfaces of the dam to be sheathed thereby,
   (d) whereby the edges of the sheet are adapted to extend beyond said dam surfaces into trenches formed adjacent the dam,
   (e) said edges of said sheet being secured in said trenches by said anchoring means,
   (f) whereby the sheet is fixed against dislodgment from the dam,
   (g) said sheet thereby sheating the dam and providing an external overflow passage over the dam, separated from the surfaces of the dam and facilitating overflow.

2. A protective covering in accordance with claim 1, said covering comprising a continuous sheet having the following properties:
   (a) flexibility sufficient to enable the sheet to conform to the contours of the dam and its surface irregularities,
   (b) structural strength sufficient to maintain the integrity of the sheet under conditions encountered at the dam site,
   (c) impermeability sufficient to provide a liquid-tight barrier between the dam and the impounded water, and,
   (d) chemical inertness with respect to the impounded water.

3. A protective covering in accordance with claim 2, wherein the continuous sheet is a sheet made of synthetic rubber.

4. A protective covering in accordance with claim 3, wherein the continuous sheet is a sheet made of a chlorosulfonated polyethylene polymer.

5. A protective covering in accordance with claim 3, wherein the continuous sheet is a sheet made of an elasticized polyolefin.

6. A protective covering in accordance with claim 2, wherein the continuous sheet is laminated with at least one reinforcing layer secured thereto to form a laminated structure.

7. A protective covering in accordance with claim 6, wherein the reinforcing layer defines a net which is adapted to support the continuous sheet in the process of putting said continuous sheet in place on a dam.

8. A protective covering in accordance with claim 2, wherein:
   (a) the continuous sheet consists of a plurality of layers interleaved with a plurality of reinforcing layers,
   (b) there being three layers of the continuous sheet and two reinforcing layers,
   (c) said three layers of the continuous sheet comprising the outer and intermediate layers,
   (d) said two reinforcing layers being interleaved between said outer and intermediate layers of the continuous sheet, (e) said outer, intermediate and interleaved layers being bonded to each other to form a five-ply laminated structure.

9. A method of protecting earth dams against failure caused by overflow or internal erosion by the impounded water, said method comprising:

(a) forming a relatively smooth, continuous surface on the crest and upstream and downstream faces of an earth dam, (b) sheathing said smooth, continuous surface with a water impervious sheet, (c) forming trenches in the side embankments and lake bottom or river bed adjacent the dam and along the side edges of the sheet, and (d) securing said side edges of the sheet in said trenches by means of anchoring means to secure the sheet to the crest and upstream and downstream faces of the dam, (e) thereby preventing erosion of the dam by preventing entry of the impounded water between the sheet and the crest and upstream and downstream faces of the dam and forming a passage over the dam, separated from the surfaces of the dam, for overflow water.

10. The method of claim 9, wherein the relatively smooth, continuous surface on the crest and upstream face of the dam is formed by applying a covering of small stones or crushed rock to said crest and upstream face.

* * * * *